United States Patent
Witt et al.

(10) Patent No.: US 7,156,594 B1
(45) Date of Patent: Jan. 2, 2007

(54) DEVICE, SYSTEM, AND METHOD FOR RESTRAINING PLANAR OBJECTS

(76) Inventors: Michael R. Witt, 1142 Oak Creek Rd., Palmyra, VA (US) 22963; Wladyk Muzyka, 658 Bunker Hill La., Keswick, VA (US) 22947

( * ) Notice: Subject to any disclaimer, the term of this patent is extended or adjusted under 35 U.S.C. 154(b) by 190 days.

(21) Appl. No.: 10/985,240

(22) Filed: Nov. 10, 2004

(51) Int. Cl.
*B60P 7/08* (2006.01)

(52) U.S. Cl. ............... 410/120; 410/32; 410/34; 410/77

(58) Field of Classification Search ............... 410/32, 410/34, 35, 77, 120, 155; 224/552, 553; 248/593; 206/454; 211/72, 41.15, 41.14, 211/41.16
See application file for complete search history.

(56) References Cited

U.S. PATENT DOCUMENTS 4,688,976 A * 8/1987 Rowley et al. ............ 410/156

* cited by examiner

*Primary Examiner*—Stephen Gordon
(74) *Attorney, Agent, or Firm*—Michael Haynes PLC; Michael N. Haynes

(57) ABSTRACT

Certain exemplary embodiments can provide an apparatus comprising a first arm defining a pair of opposing ends, each of said opposing ends attached to a restrainer; a second arm defining a translatable end to which a restrainer is attached and an opposing end attached to said first arm; a third arm defining a translatable end to which a restrainer is attached and an opposing end attached to said first arm; and a first restorer attached between said second arm and said third arm, said first restorer resisting relative motion between said second arm and said third arm.

14 Claims, 3 Drawing Sheets

DEVICE, SYSTEM, AND METHOD FOR RESTRAINING PLANAR OBJECTS

BRIEF DESCRIPTION OF THE DRAWINGS

The invention and its wide variety of potential embodiments will be more readily understood through the following detailed description, with reference to the accompanying drawings in which.

DEFINITIONS

Figure 1:
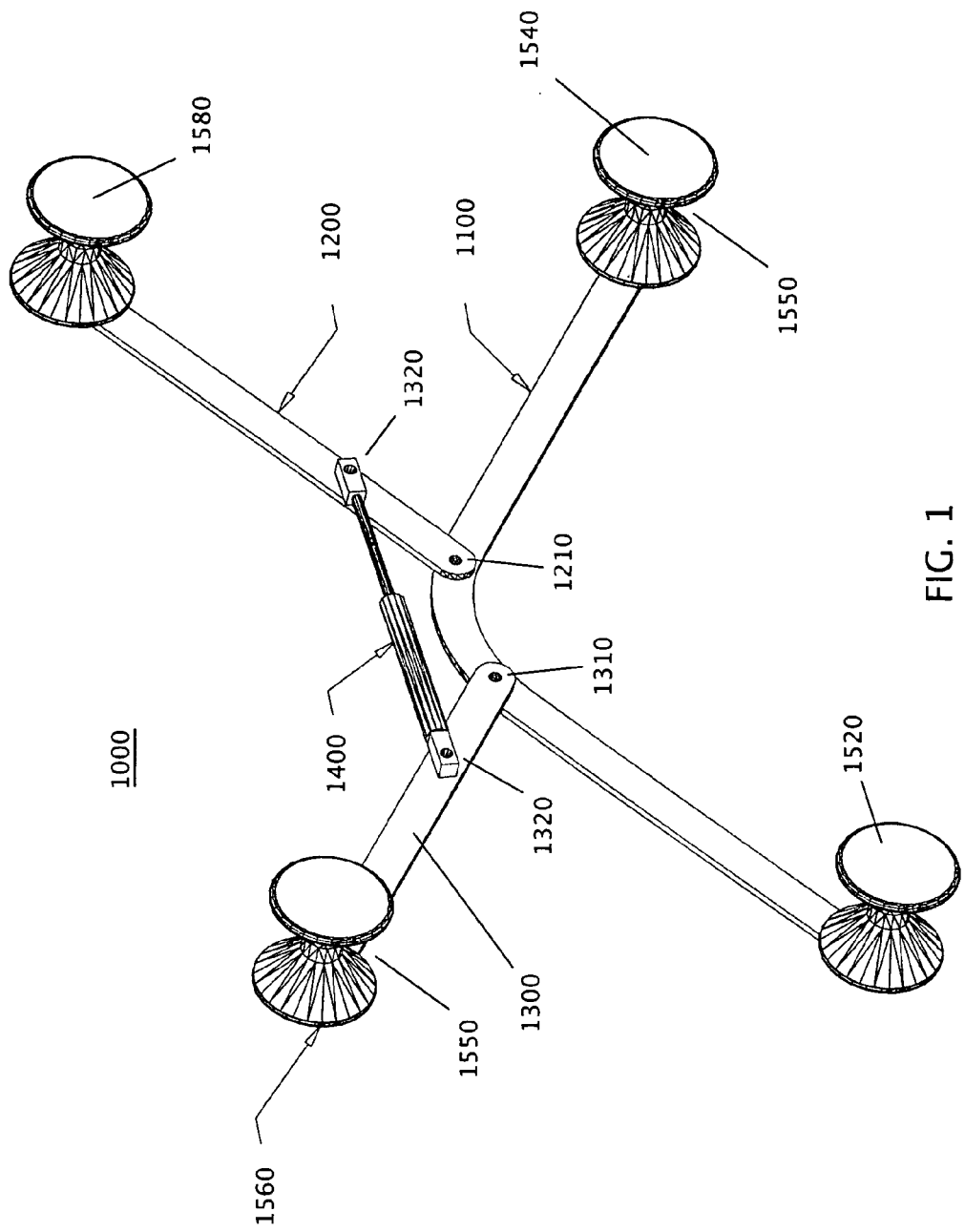
FIG. 1 is a perspective view of an exemplary embodiment of an apparatus 1000.

When the following terms are used herein, the accompanying definitions apply:

apparatus—a mechanism and/or device.
arm—an elongated structural member, which need not be solely linear.
attach—to fasten, secure, couple, and/or join.
can—is capable of, in at least some embodiments.
comprising—including but not limited to.
contact—to touch.
couple—to link and/or connect.
end—an extremity and its vicinity.
may—is allowed to, in at least some embodiments.
non-marring—not typically capable of blemishing or marking.
opposing—located at or near a substantially opposite end from.
planar object—an object having thickness, width, and length, the thickness less than approximately 20 percent of the smaller of the width and length, and having a surface defined by the width and length, the surface being substantially flat. Examples include sports boards, sheet lumber, wall mirrors, plate glass, windshields, drywall, etc.
plurality—the state of being plural and/or more than one.
predetermined—established in advance.
proximate—near.
restrainer—a device adapted to restrain movement, in at least one direction, of an object in contact therewith.
roller—a cylindrical or spherical device that rolls or rotates.
rotatable—capable of rotation.
sports board—any of a variety of board-like objects used for sporting and/or recreational activities, such as a surfboard, longboard, shortboard, powerboard, jetboard, wakeboard, kneeboard, skimboard, bodyboard, hoverboard, sailboard, windsurfer board, kiteboard, snowboard, skateboard, water ski, snow ski, etc.
spring—an elastic device, such as a coil of wire, that regains its original shape after being compressed or extended. Examples include coiled springs, helical springs, leaf springs, Belleville springs, resilient members, structures formed of a shape memory material, etc.
substantially—to a great extent or degree.
system—a collection of mechanisms, devices, data, and/or instructions, the collection designed to perform one or more specific functions.
translatable—capable of being transferred from one place to another and/or of being moved with respect to something else.
V-groove—a groove having a cross-section shaped substantially similar to the letter V.

DETAILED DESCRIPTION

Those who transport or store sport boards often need an apparatus that gently secures the board to prevent substantial movement of the board, marring of the board, and/or rubbing and/or contact between multiple secured boards.

Certain exemplary embodiments can provide an apparatus comprising a first arm defining a pair of opposing ends, each of said opposing ends attached to a restrainer; a second arm defining a translatable end to which a restrainer is attached and an opposing end attached to said first arm; a third arm defining a translatable end to which a restrainer is attached and an opposing end attached to said first arm; and a first restorer attached between said second arm and said third arm, said first restorer resisting relative motion between said second arm and said third arm.

FIG. 1 is a perspective view of an exemplary embodiment of an apparatus 1000, which can comprise a "stationary" arm 1100 to which arm 1200 is rotatably coupled via attachment 1210. An arm 1300 can be rotatably coupled to arm 1100 via attachment 1310. Note that "stationary" arm 1100 is comprised of connected combination of linear portions, thereby forming a non-linear and/or curvilinear member. Note that arms 1200 and 1300 are linear, although they could be curvilinear.

Constraining the motion of arms 1200 and 1300 with respect to each, and/or attempting to restore the relative positions of arms 1200 and 1300 with respect to each other, can be a restorer 1400, which can be a gas and/or liquid dampened spring device, such as a screen door closer, a strut, a shock absorber, or the like. Restorer 1400 can be rotatably coupled via attachment 1220 to arm 1200 and/or rotatably coupled via attachment 1320 to arm 1300. The mounting point of attachment 1220 and/or attachment 1320 can be adjustable along arm 1200 and/or arm 1300. The tension, restoring force, resistance, resistive force, and/or damping, etc., provided by restorer 1400 can be adjustable.

Mounted at, near, and/or proximate one end of arm 1100 can be a restrainer 1520, which can be a fixed non-rotatable bushing and/or a rotatable roller, such as trailer roller, such as a bow roller, keel roller, and/or bowstop roller, etc. Restrainer 1520 can be made of a low friction, shock absorbing, gripping, non-marring, non-marking, UV-resistant, nylon, teflon, polyurethane, and/or rubber material. Exemplary rollers can be obtained from Stoltz Super Rollers of Ft. Lauderdale, Fla. A similar restrainer 1540 can be fixedly and/or rotatably mounted at, near, and/or proximate the opposite end of arm 1100. Similar restrainers 1560 and 1580 can be rotatably mounted at, near, and/or proximate to distal, movable, and/or translatable ends of arms 1300 and 1200, respectively. Each restrainer 1520, 1540, 1560, 1580 can define a groove 1550, which can roughly resemble the letter "V" in cross-section, thereby giving rise to the name "V-grooved roller".

Any of apparatus 1000; arms 1100, 1200, and 1300; and/or restrainers 1520, 1540, 1560, and 1580 can define a plane of limited thickness, which can be substantially coplanar and/or parallel with a substantially planar object to be secured by apparatus 1000. Thus, for example, restrainers 1520, 1540, 1560, and/or 1580 can cooperate to prevent substantial movement of a planar object perpendicular to a plane substantially defined by restrainers 1520, 1540, 1560, and 1580. As another example, apparatus 1000 can resist substantial movement of the planar object with respect to apparatus 1000.

Apparatus 1000 can be mounted to a building, such as to the floor and/or wall of a garage, shop, storage area, retail store, etc. Apparatus 1000 can be mounted to a transport, such as a car, truck, boat, trailer, cart, etc. Apparatus 1000 can be mounted via a mount that attaches to any portion of arm 1100.

Figure 2:
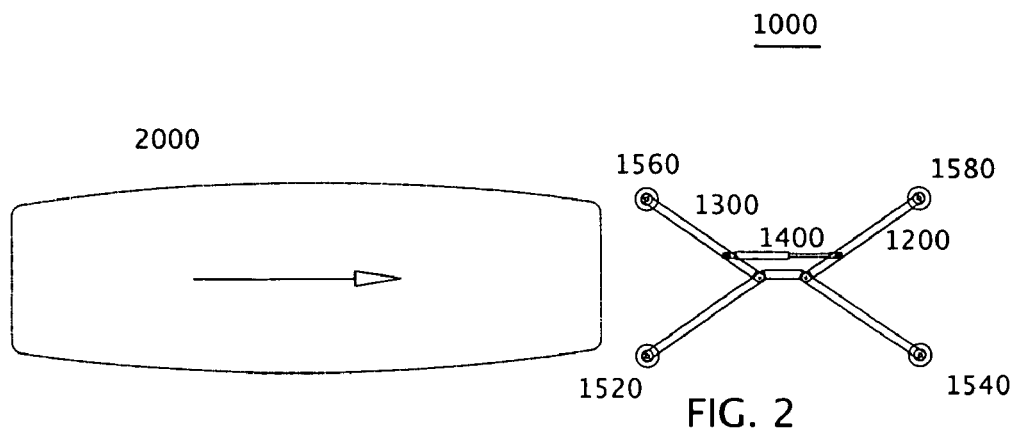
FIG. 2 is an front view of an exemplary embodiment of a board 2000 just prior to engaging with apparatus 1000.
Figure 3:
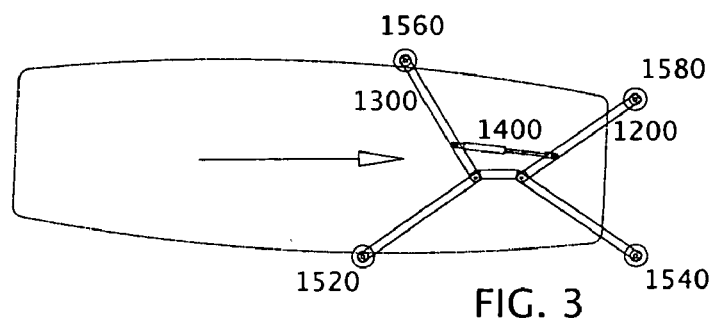
FIG. 3 is an front view of an exemplary embodiment of a board 2000 beginning to engage with apparatus 1000.
Figure 4:
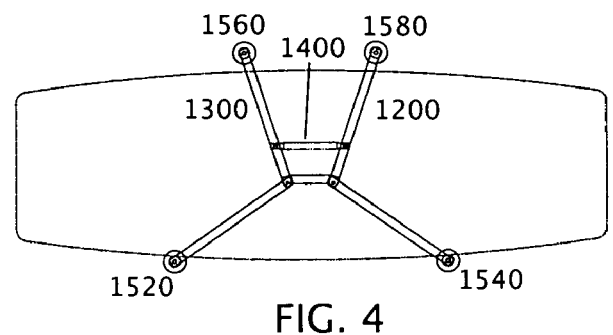
FIG. 4 is an front view of an exemplary embodiment of a board 2000 fully engaged with apparatus 1000.

FIGS. 2–4 illustrate an exemplary embodiment of a process of engaging a board 2000 with an apparatus 1000 of FIG. 1 for securely transporting and/or storing board 2000.

FIG. 2 is an front view of an exemplary embodiment of a board 2000 just prior to engaging with apparatus 1000. Note the position of restrainer 1560, the relative separation between arm 1300 and arm 1200, and the extension of restorer 1400.

FIG. 3 is an front view of an exemplary embodiment of a board 2000 beginning to engage with apparatus 1000. Note that restrainers 1560 and 1520 have traveled along, and are in simultaneous contact with, opposing edges of the outer surface of board 2000. Note also that arm 1300 has moved closer to arm 1200 and restorer 1400 has shortened. Note further that if continued along the indicated path, board 2000 will substantially simultaneously contact restrainers 1540 and 1580.

FIG. 4 is an front view of an exemplary embodiment of a board 2000 fully engaged with apparatus 1000. Note that both restrainers 1520, 1540, 1560, and 1580 are contacting, gripping, and/or securing edges of the outer surface of board 2000, the absolute and relative positions of arms 1300 and 1200, and the length of restorer 1400.

Figure 5:
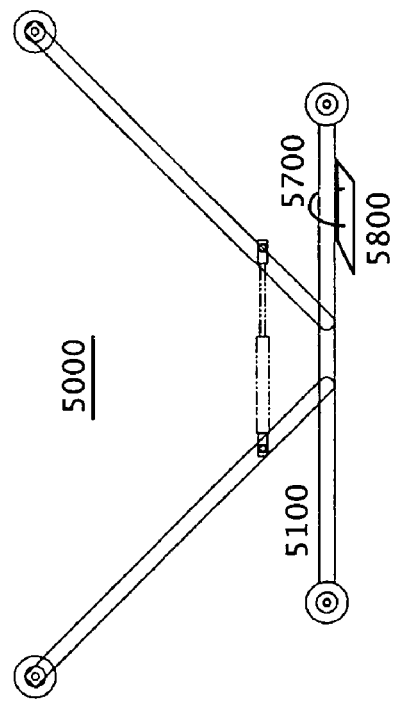
FIG. 5 is an front view of an exemplary embodiment of an apparatus 5000.

FIG. 5 is an front view of an exemplary embodiment of an apparatus 5000. In this embodiment, the "stationary" arm 5100 is connected to a structure 5800, such as a building and/or a transport, via a mount 5700.

Figure 6:
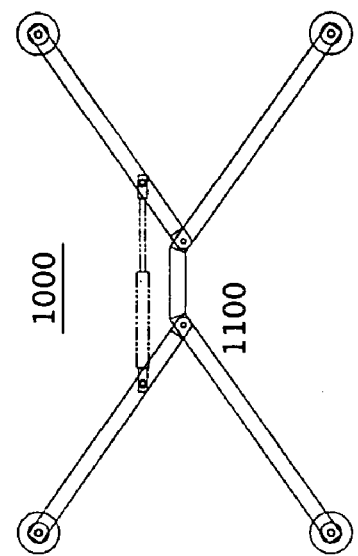
FIG. 6 is an front view of an exemplary embodiment of an apparatus 1000.

FIG. 6 is an front view of an exemplary embodiment of an apparatus 1000.

Figure 7:
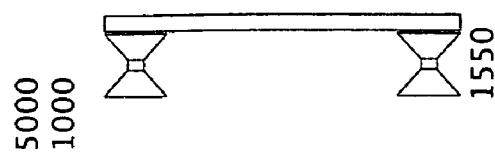
FIG. 7 is a side view of an exemplary embodiment of apparatus 5000 or 1000.

FIG. 7 is a side view of an exemplary embodiment of apparatus 5000 or 1000. Note the "V" shape of the grove 1550 defined by the restrainers. Groove 1550 can be sized to fit a wide range of board thicknesses, a narrow range of board thicknesses, and/or a particular board thickness.

Certain exemplary embodiments can include, for example, one, two, or more arms having restrainers located at each end of each arm. The arms can be attached to a structure via a mount or via an intermediate support member. To provide the desired restorative forces, the arms can be formed from slightly to somewhat resilient material. The arms can be utilized below the yield strength of the material. For example, the arms can be formed from resilient woods such as maple, birch, and/or willow, etc; polymers such as nylon, ABS, and/or polycarbonate, etc; and/or metals/alloys such as steel, aluminum, Nitinal, and/or a shape memory alloy, etc.

Certain exemplary embodiments can include 2 or more pairs of arms. Each arm can have one or two relatively, freely, and/or independently movable ends. At, near, and/or proximate one and/or each arm end a restrainer can be attached. For any given pair of arms, the restrainers can be located on opposite sides of a width of the board (and/or planar object) or can be located along a common side of the board. Each arm in a given pair of arms (and/or that arm's restrainer) can be urged toward the other arm of the pair (and/or its restrainer) by a restorer. The restorer can take any of several forms. For example, the restorer can span between the arms, such as can be accomplished via a helical spring, a leaf spring (having any number of leafs, including a single leaf), an elastic cord, and/or simply resilient arms without any separately distinguishable restorer, but having an inherent and sufficient restorative capability. As another example, each arm can have its own dedicated restorer, such as a coil spring having a central axis approximately co-axially to a rotational axis of that arm.

Certain exemplary embodiments can utilize a restrainer that rolls and/or allows the board to slide along the restrainer. For example, the restrainer can be a non-rotatable V-grooved bushing that is constructed of teflon, nylon, or other relatively low friction material.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. An apparatus, comprising:
   a first arm defining a first end and a second end, said first arm comprising:
   a first non-marring rotatable V-grooved roller attached proximate to the first end of said first arm;
   a second non-marring rotatable V-grooved roller proximate to the second end of said first arm;
   a second arm defining a third end and a fourth end, the third end of said second arm rotatably attached to said first arm, said second arm comprising:

a third non-marring rotatable V-grooved roller attached to the fourth end of said second arm; and
a third arm defining a fifth end and a sixth end, the fifth end of said third arm rotatably attached to said first arm, said third arm comprising:
  a fourth non-marring rotatable V-grooved roller attached to the sixth end of said third arm;
a first spring attached between said second arm and said third arm, said first spring resisting relative motion between said second arm and said third arm;
wherein said apparatus is adapted to prevent movement of a sports board perpendicular to a plane substantially defined by said first, second, third, and fourth non-marring rotatable V-grooved rollers.

2. An apparatus, comprising:
a first arm defining a first end and a second end, said first arm comprising:
  a first restrainer attached proximate to the first end of said first arm;
  a second restrainer proximate to the second end of said first arm;
a second arm defining a third end and a fourth end, the third end of said second arm rotatably attached to said first arm, said second arm comprising:
  a third restrainer attached to the fourth end of said second arm; and
  a third arm defining a fifth end and a sixth end, the fifth end of said third arm rotatably attached to said first arm, said third arm comprising:
    a fourth restrainer attached to the sixth end of said third arm;
a first restorer attached between said second arm and said third arm, said first restorer resisting relative motion between said second arm and said third arm;
wherein said apparatus is adapted to prevent movement of a planar object perpendicular to a plane substantially defined by said first, second, third, and fourth restrainers.

3. The apparatus of claim 2, wherein said first arm is substantially linear.

4. The apparatus of claim 2, wherein said first arm is substantially curvilinear.

5. The apparatus of claim 2, wherein said first restrainer is attached to a first portion of said first arm said second restrainer is attached to a second portion of said first arm.

6. The apparatus of claim 2, wherein said first restrainer is attached to a first portion of said first arm said second restrainer is attached to a second portion of said first arm, and wherein said first portion is attached to said second portion.

7. The apparatus of claim 2, wherein said first restrainer is attached to a first portion of said first arm said second restrainer is attached to a second portion of said first arm, and wherein a second restorer defines a coupler.

8. The apparatus of claim 2, wherein said first restrainer defines a groove adapted to contact an outer surface of the planar object.

9. The apparatus of claim 2, wherein each of said first, second, third, and fourth restrainers defines a groove adapted to contact an outer surface of the planar object.

10. The apparatus of claim 2, wherein each of said first, second, third, and fourth restrainers is rotatably attached to its respective arm.

11. The apparatus of claim 2, wherein said first restrainer comprises a roller.

12. The apparatus of claim 2, wherein said first restrainer comprises a roller that defines a V-groove adapted to contact an outer surface of the planar object.

13. The apparatus of claim 2, further comprising a mount adapted to secure said first arm to a transport.

14. The apparatus of claim 2, further comprising a mount adapted to secure said first arm to a building.

* * * * *